US011987046B2

(12) United States Patent
Murata et al.

(10) Patent No.: US 11,987,046 B2
(45) Date of Patent: May 21, 2024

(54) PRINTING APPARATUS AND CONTROL METHOD

(71) Applicant: CANON KABUSHIKI KAISHA, Tokyo (JP)

(72) Inventors: Ryosuke Murata, Tokyo (JP); Takuya Suto, Kanagawa (JP); Toshiro Sugiyama, Kanagawa (JP); Daigo Kuronuma, Kanagawa (JP); Kenji Shimamura, Saitama (JP); Ryo Harigae, Tokyo (JP); Toshiaki Yamaguchi, Tokyo (JP); Kouhei Tokuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 17/189,613

(22) Filed: Mar. 2, 2021

(65) Prior Publication Data

US 2021/0276350 A1 Sep. 9, 2021

(30) Foreign Application Priority Data

Mar. 5, 2020 (JP) ................................ 2020-038124

(51) Int. Cl.

*B65H 29/68* (2006.01)
*B41J 11/00* (2006.01)
*B41J 13/00* (2006.01)
*B41J 13/02* (2006.01)
(Continued)

(52) U.S. Cl.

CPC ......... *B41J 13/0036* (2013.01); *B41J 13/025* (2013.01); *B41J 13/106* (2013.01);
(Continued)

(58) Field of Classification Search

CPC .... B41J 13/0036; B41J 13/025; B41J 13/106; B41J 11/003; B41J 3/46; B65H 29/12;
(Continued)

(56) References Cited

U.S. PATENT DOCUMENTS

| | | | | | |
|---|---|---|---|---|---|
| 6,726,197 | B2 | 4/2004 | Aoki | | |
| 2002/0125632 | A1 * | 9/2002 | Aoki | ........................ | B65H 7/02 271/279 |
| 2017/0362045 | A1 * | 12/2017 | Masuda | .................. | G07B 1/00 |

FOREIGN PATENT DOCUMENTS

| | | | | |
|---|---|---|---|---|
| JP | 05024318 | A | * | 2/1993 |
| JP | 05085654 | A | * | 4/1993 |

(Continued)

OTHER PUBLICATIONS

Office Action dated Dec. 1, 2023, in Japanese Application No. 2020-038124.

(Continued)

*Primary Examiner* — Luis A Gonzalez
(74) *Attorney, Agent, or Firm* — Venable LLP

(57) ABSTRACT

A printing apparatus comprises a conveyance unit configured to convey a sheet to a printing unit configured to perform printing; a control unit configured to cause the conveyance unit to hold the sheet onto which printing was performed by the printing unit; and a receiving unit configured to receive an ejection instruction for instructing to eject the sheet. The control unit, in a case where the receiving unit receives the ejection instruction, controls the conveyance unit to eject the sheet to outside of the apparatus after a predetermined time has elapsed.

12 Claims, 9 Drawing Sheets

(51) Int. Cl.
*B41J 13/10* (2006.01)
*B65H 29/12* (2006.01)

(52) U.S. Cl.
CPC ........... *B65H 29/125* (2013.01); *B65H 29/68* (2013.01); *B65H 2405/58* (2013.01); *B65H 2551/29* (2013.01); *B65H 2801/03* (2013.01)

(58) Field of Classification Search
CPC ................ B65H 29/68; B65H 2551/29; B65H 2511/10; B65H 2511/414; B65H 2513/512
See application file for complete search history.

(56) References Cited

FOREIGN PATENT DOCUMENTS

| | | | |
|---|---|---|---|
| JP | 6-329319 | A | 11/1994 |
| JP | 2003-020138 | A | 1/2003 |
| JP | 2003-221154 | A | 8/2003 |
| JP | 2018-114648 | A | 7/2018 |
| JP | 2021-117260 | A | 8/2021 |

OTHER PUBLICATIONS

U.S. Appl. No. 17/186,228, Takuya Suto, Toshiro Sugiyama, Ryosuke Murata, Daigo Kuronuma, Kenji Shimamura, Ryo Harigae, Toshiaki Yamaguchi, Kouhei Tokuda, filed Feb. 26, 2021.
U.S. Appl. No. 17/186,259, Daigo Kuronuma, Toshiaki Yamaguchi, Takuya Suto, Toshiro Sugiyama, Kouhei Tokuda, Kenji Shimamura, Ryo Harigae, Ryosuke Murata, filed Feb. 26, 2021.

* cited by examiner

PRINTING APPARATUS AND CONTROL METHOD

BACKGROUND OF THE INVENTION

Field of the Invention

The present invention mainly relates to a printing apparatus and a control method.

Description of the Related Art

Up until now, printing apparatuses that can print on roll-shaped printing media such as roll paper and sheet form printing media such as cut paper have been proposed. In Japanese Patent Laid-Open No. 2018-114648, a printing apparatus that ejects cut paper that has been set in a sheet feeding tray from the same ejection port as with roll paper has been proposed.

There are cases where no sheet discharging tray is mounted on such a printing apparatus, and so that printing media ejected from an ejection port does not drop, a trailing edge of printing media is held by a sheet discharging roller, and the printing apparatus performs a sheet ejection process immediately when an ejection instruction is received by a user operation on a console panel.

However, the user must perform an operation on the console panel and receive the printing media that is ejected, and there is the possibility that as the result of the user operating the console panel with one hand and receiving the ejected printing medium with the other hand, they are not able to properly receive the printing medium and it gets damaged. Accordingly, there was the problem that it was not convenient for the user when causing the printing apparatus to execute the ejection process.

SUMMARY OF THE INVENTION

An aspect of the present invention is to eliminate the above-mentioned problem with conventional technology.

A feature of the present invention is to provide a technique for providing a printing apparatus with improved convenience for the user when executing an ejection process.

According to a first aspect of the present invention, there is provided a printing apparatus comprising: a conveyance unit configured to convey a sheet to a printing unit configured to perform printing; a control unit configured to cause the conveyance unit to hold the sheet onto which printing was performed by the printing unit; and a receiving unit configured to receive an ejection instruction for instructing to eject the sheet, wherein the control unit, in a case where the receiving unit receives the ejection instruction, controls the conveyance unit to eject the sheet to outside of the apparatus after a predetermined time has elapsed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
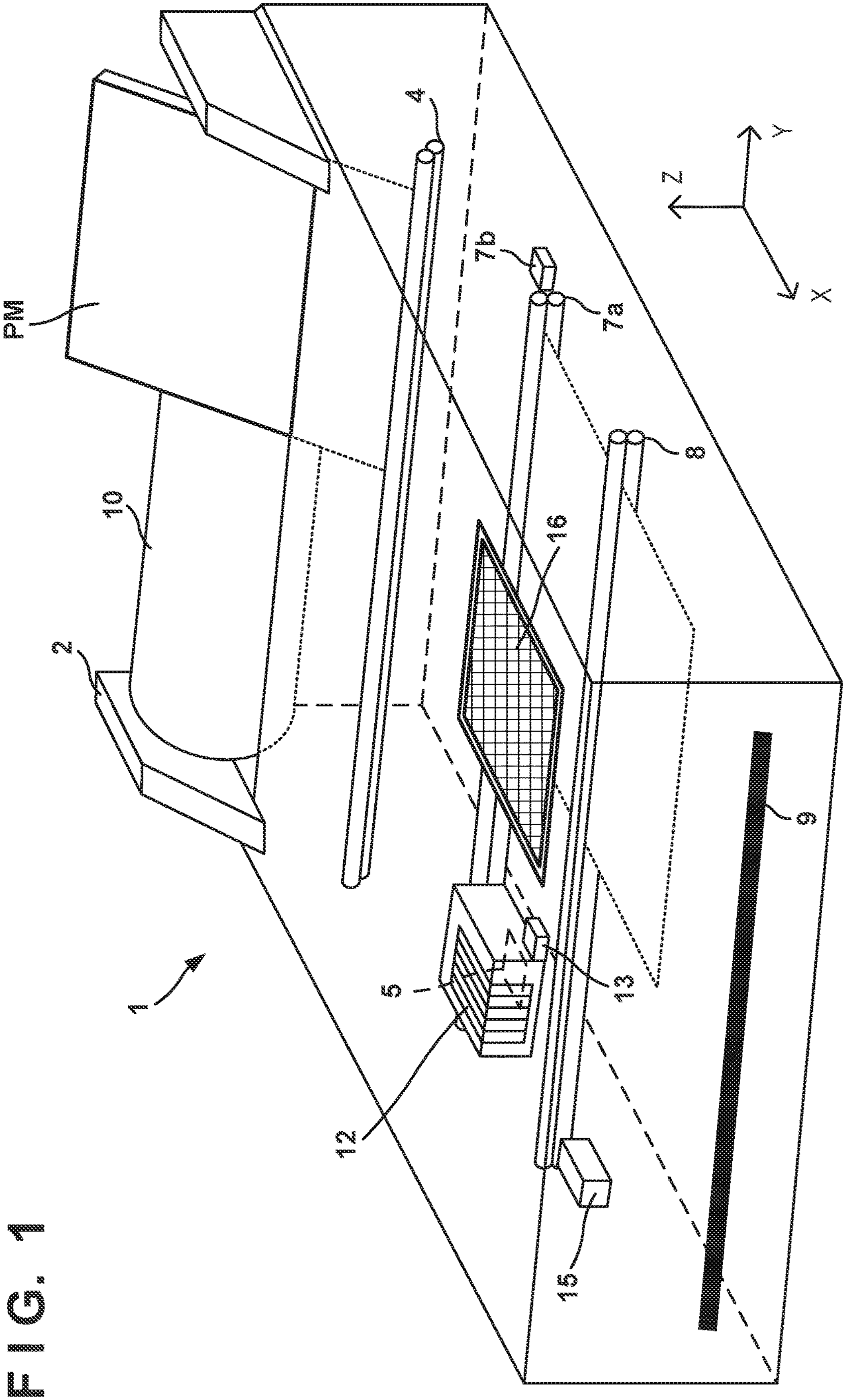
FIG. 1 is a schematic view of a printing apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic view of a printing apparatus 1 in this embodiment. In this embodiment, a case will be described in which the present invention is applied to a serial ink-jet printing apparatus that performs printing by scanning a carriage mounted with a printhead; however, the present invention is applicable to a printing apparatus of another form.

Note that "printing" encompasses not only cases where meaningful information such as text and figures is formed, but also cases where broadly, an image, a design, a pattern, and the like—irrespective of whether they are meaningful or meaningless—are formed on a printing medium or processing of a medium is performed, and it does not matter whether or not what is formed is a manifestation that can be perceived through vision by a person. Also, although sheet-like paper is envisioned as the "printing medium" in the present embodiment, the "printing medium" may be fabric, a plastic film, and the like.

<Apparatus Configuration>

The printing apparatus 1 is an apparatus including a hold unit 2, a supply unit 4, a printing unit 5, a conveyance unit 7, an ejection unit 8, a detecting unit 13, a cutter unit 15, and an operation unit 16, and is for printing an image on a printing medium PM. In the case of this embodiment, the printing medium PM configures a cut sheet that is cut to a standard size, and the printing medium PM is supplied by the supply unit 4 to the conveyance unit 7 one sheet at a time. However, the printing medium PM may be a roll sheet wound in a rolled shape. In the present specification, the supply unit 4, the conveyance unit 7, and the ejection unit 8 are collectively referred to as a conveyance unit. Note that at least one of the supply unit 4 and the ejection unit 8 of the conveyance unit may be omitted. In such a case, the conveyance unit 7 operates to realize the function of at least one of the supply unit 4 and the ejection unit 8.

The hold unit 2 includes a structure for holding a supply of printing media from the supply unit 4. For example, in a case where printing media is a sheet-like printing media that is cut to a standard size (cut sheet), the hold unit 2 includes a sheet feeding tray. Also, in the case where the printing medium is roll-shaped printing media (a roll sheet) that is wound in a sheet form, the hold unit 2 may include a spool shaft for supporting the roll sheet. The supply unit 4 includes a supply roller for supplying printing media to the conveyance unit 7. In the case where printing media is a roll sheet, in the supply unit 4, a driving mechanism for causing this to rotate may be arranged for pulling out the printing medium PM and assisting in the winding.

The conveyance unit 7 includes a conveyance roller 7*a* and a conveyance sensor 7*b* for conveying the printing medium PM in a forward conveyance direction (X direction) of FIG. 1. In the case of this embodiment, the conveyance roller 7*a* includes the pair of a driving roller and a driven roller. The conveyance unit 7 comprises a driving mechanism (not shown) and rotationally drives the driving roller. The driven roller is pressed against the driving roller and rotationally driven. Accordingly, the printing medium PM is conveyed on the platen nipped between the driving roller and the driven roller. The platen (not shown) ensures a distance between the printing unit 5 and the printing medium. The driving mechanism of the conveyance unit 7 can employ a gear mechanism where a motor is made to be a drive source, for example. The amount of rotation of the conveyance unit 7 is detected by a sensor (not shown) (for example, an encoder) and the conveyance amount of the printing medium PM is controlled. The conveyance sensor 7*b* is a sensor for detecting a leading edge or a trailing edge in the conveyance direction of a roll sheet or a cut sheet.

In the description below, in cases where the upstream side and downstream side are referred to, the direction of conveyance of the printing medium PM by the conveyance unit 7 is made to be the reference. The conveyance direction of the printing medium PM is indicated by the arrow X in the figures and sometimes called a sub-scanning direction. An arrow Y indicates a direction perpendicular to the conveyance direction of the printing medium PM and this direction is sometimes called the main scanning direction or a sheet width direction. The pair of rollers of the supply unit 4 and the pair of rollers of the conveyance unit 7 are arranged so the axial direction thereof is parallel to the main scanning direction Y.

Note that in one example, the conveyance sensor (not shown) is arranged on the downstream side in the conveyance direction of the conveyance unit 7. The conveyance sensor is a sensor such as an optical sensor for determining whether or not printing media are being conveyed properly by the conveyance unit 7. In one example, the conveyance sensor can detect the size of the printing media in at least one of the X direction and the Y direction of the printing media that is conveyed.

The printing unit 5 is arranged on the downstream side from the conveyance unit 7 and can print an image on the printing medium PM that is conveyed by the conveyance unit 7. In this embodiment, the printing unit 5 forms a printhead including a plurality of nozzles that discharge ink.

On the printing unit 5, a carriage 12 is mounted. A tank which supplies ink to the printing unit 5 is mounted in the carriage 12. A driving mechanism (not shown) can reciprocally move the carriage 12 in the Y direction. As a driving mechanism for the carriage 12, for example, a belt transmission mechanism having a motor as a drive source can be used. The detecting unit 13 or a sensor (for example, an encoder) (not shown) detects the position of the carriage 12 to control the movement of the carriage 12.

The detecting unit 13 can detect the image printed on the printing medium PM, an edge of the printing medium PM, the thickness of the printing medium PM, or the like. The detecting unit 13 is mounted on the carriage 12 and moves in the Y direction, together with the carriage 12. The detection result obtained by the detecting unit 13 can be associated with a position on the printing medium PM by using the detection result of the position of the carriage 12 and the conveyance amount of the printing medium PM by the conveyance unit 7. In one example, the detecting unit 13 detects the position of the carriage 12.

The detecting unit 13 comprises an optical sensor that comprises a light-emission element and a light-sensitive element, for example. The light-emission element emits light towards the platen, and receives the reflected light in the light-sensitive element. When detecting the leading edge position of the printing medium PM by using the detecting unit 13, for example, the printing medium PM is conveyed to temporarily pass through the detecting unit 13, and then the printing medium PM is conveyed backward towards the upstream side. From the difference in the reflectance between the platen and the printing medium PM, the value for the light received by the light-sensitive element when the leading edge of the printing medium PM passes through changes. From the rotation amount detection result of the conveyance unit 7 at this time, it is possible to detect the position of the leading edge of the printing medium PM. Similarly, the position of the image printed on the printing medium PM can be detected from the result of detection of a rotation amount of the conveyance unit 7 when the light-sensitive element light reception result changes and the result of detecting the position of the carriage 12.

The ejection unit 8 conveys the printing medium PM to an ejection port 9. Also, the ejection unit 8 according to the present embodiment, before completing ejection of the printing medium PM, holds the printing medium PM, and executes the processing of ejection of the printing medium PM in response to an ejection instruction operation via the operation unit 16. Regarding details of the ejection process, description will be given later with references to FIGS. 4 to 8.

The cutter unit 15 comprises a cutter for cutting the printing medium PM in a Y direction. The cutter unit 15 can reciprocally move in the Y direction by a driving mechanism (not shown). In one example, the cutter unit 15 has a structure for engaging the carriage 12, and can reciprocally move in the Y direction pulled by the carriage 12. In such a case, the cutter unit 15 may be arranged upstream in the conveyance direction from the ejection unit 8.

On the top of the printing apparatus 1, the operation unit 16 on which the user can input various settings and commands, and confirm information is arranged. In one example, the operation unit 16 includes at least a display apparatus such as a liquid crystal display, a touch display, and a light-emitting module such as an LED.

<Control Unit>

Figure 2:
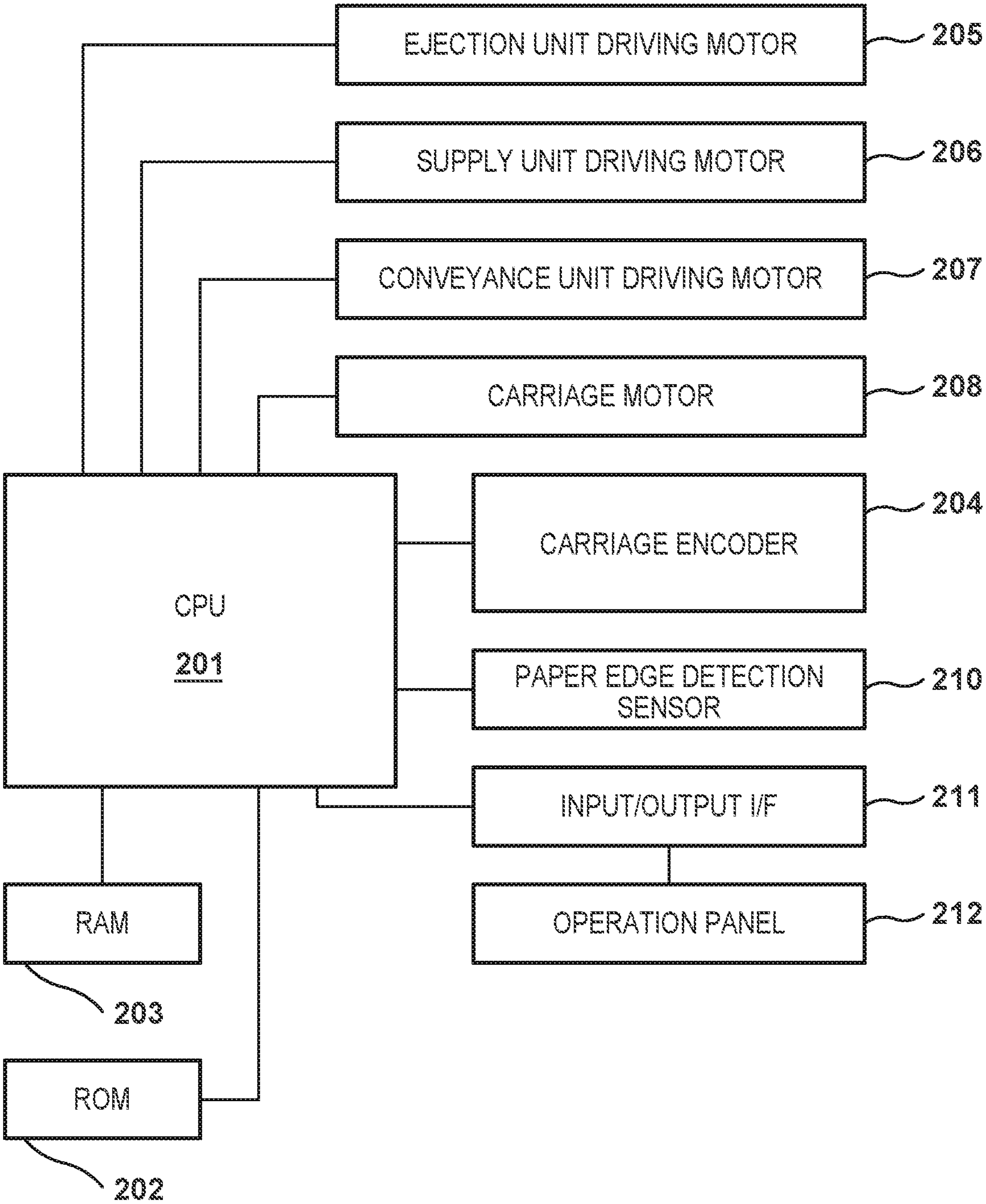
FIG. 2 is a block diagram illustrating a configuration of a control unit of the printing apparatus according to the present embodiment.

Next, a configuration of the control unit of the printing apparatus 1 will be described with reference to FIG. 2. A CPU 201 is a processor, programmable logic circuit, or microprocessor that controls the entire printing apparatus 1. In addition, the CPU 201 performs various processes such as a print process and a cutting process by reading out control programs stored in a ROM 202 and cooperating with a RAM 203 and the like. The ROM 202 is a storage area for control programs, for example, a flexible disk, a magnetic disk, an optical disk, a magneto-optical disk, a CD-ROM, a CD-R, a DVD-ROM, a magnetic tape, a non-volatile memory card, an EEPROM, a silicon disk, or the like. The RAM 203 is a volatile memory used as a work area and the like for executing various programs by the CPU 201.

A carriage encoder 204, in a case where the CPU 201 executes a print process, decides the movement amount of the carriage 12 based on the data to be printed, and generates a control signal of a carriage motor 208. In one example, the carriage encoder 204 also generates a control signal for performing print control of the printing unit 5. An ejection unit driving motor 205 is a driving motor included in the ejection unit 8. A supply unit driving motor 206 is a driving motor included in the supply unit 4. A conveyance unit driving motor 207 is a driving motor for driving the conveyance unit 7. The carriage motor 208 is a motor for reciprocally moving the carriage 12 in the sheet width direction. Note that the ejection unit driving motor 205, the supply unit driving motor 206, and the conveyance unit driving motor 207 may comprise sensors for detecting the rotation amount.

A paper edge detection sensor 210 determines, based on at least one detection result of the conveyance sensor (not shown) and the detecting unit 13, whether the leading edge of the cut sheet is within a range. In one example, the paper edge detection sensor 210 performs a paper edge determination process of determining whether the paper edge is located at a position where the cutter unit 15 can cut the paper.

An input and output interface (I/F) 211 has at the least an operation panel 212 connected to it and can make a notification to a user. Also, the input/output I/F 211 has at least an input apparatus such as a button or keys connected to it, and can receive user input.

Note that in a printing apparatus in which at least one of the supply unit 4 and the ejection unit 8 are not arranged, configuration may be such that whichever of the supply unit driving motor 206 and the ejection unit driving motor 205 corresponds to the at least one of the supply unit 4 and the ejection unit 8 that is not arranged is also not arranged.

Example of Print Process

Figure 3A:
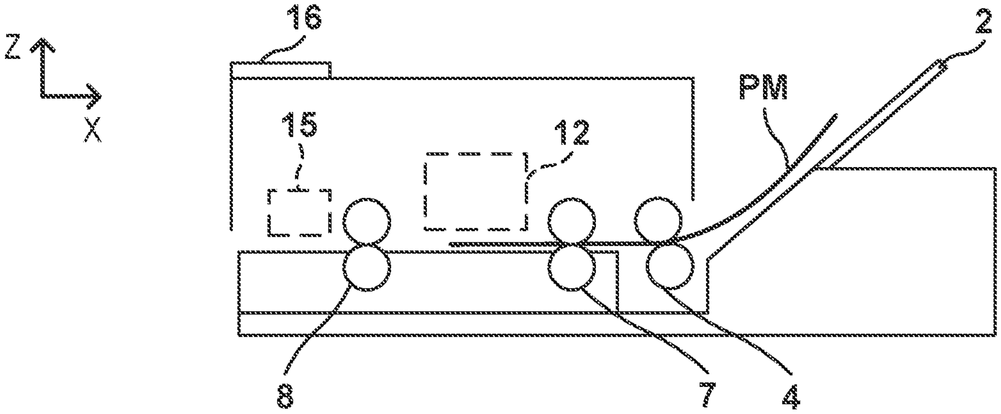
FIG. 3A is a view for describing an operation of the printing apparatus according to the present embodiment.
Figure 3B:
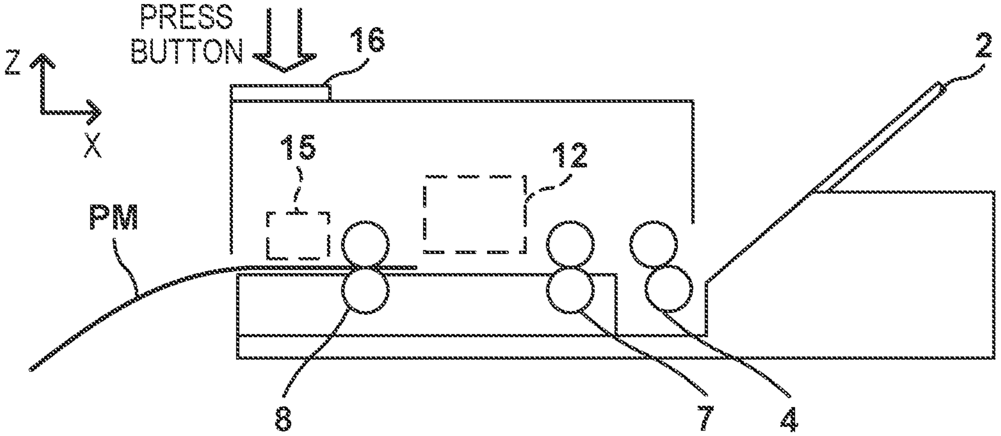
FIG. 3B is a view for describing an operation of the printing apparatus according to the present embodiment.
Figure 3C:
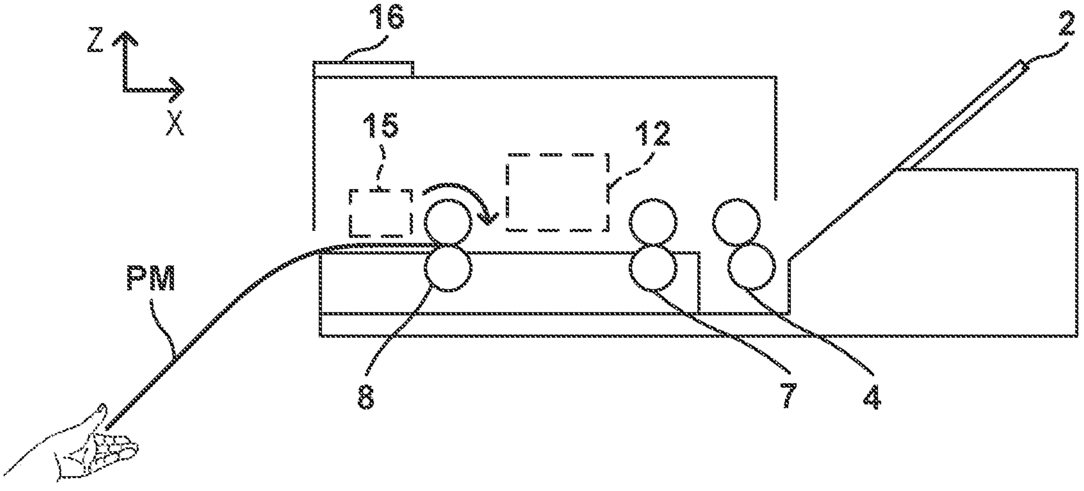
FIG. 3C is a view for describing an operation of the printing apparatus according to the present embodiment.

Next, a print process will be described with reference to FIGS. 3A to 3C. FIGS. 3A to 3C illustrate cross-sectional views of the printing apparatus 1 after a print instruction is received from a user, and in time series order, the processing transitions in order from FIG. 3A to FIG. 3B to FIG. 3C.

FIG. 3A illustrates a cross-sectional view of the printing apparatus 1 at a point in time when the print process of the printing apparatus 1 has started after the print instruction is received from the user. One cut sheet as the printing medium PM is conveyed from the supply unit 4 to the conveyance unit 7, and the cut sheet is conveyed by the conveyance unit 7 in accordance with printing by the printing unit 5.

Next, FIG. 3B illustrates a cross-sectional view of the printing apparatus 1 at a point in time when the print process of the printing apparatus 1 has completed. When printing by the printing unit 5 finishes, the cut sheet PM is conveyed by the ejection unit 8, but the ejection unit 8 stops conveyance of the cut sheet PM at a predetermined position, and holds the cut sheet PM. By this, the user recognizes that the print process has ended, and can make preparations to receive the printed cut sheet. In FIG. 3B, the user presses a button on the operation unit 16, and instructs execution of the ejection process to the printing apparatus 1.

Next, FIG. 3C illustrates a cross-sectional view of the printing apparatus 1 at a point in time when the ejection process has started. In FIG. 3C, the ejection unit 8 conveys the cut sheet PM. The user grips the cut sheet PM that has exited from the ejection port, and receives the printed cut sheet PM so that it does not drop. Here, after the button of the operation unit 16 is pressed, when the printing apparatus 1 executes the ejection process immediately, the user must grip the cut sheet PM with one hand. If the user cannot grip the cut sheet PM well, there is the possibility that the printed cut sheet will drop and be damaged.

Accordingly, the printing apparatus 1 according to the present embodiment arranges a wait time from when the ejection instruction operation is received until when the ejection process is executed, and changes the conveyance speed in the unloading process, to thereby provide a temporal margin in which a user can grip the cut sheet PM with both hands. In FIG. 4 to FIG. 8 below, an example of processing by the printing apparatus 1 for improving convenience when the user causes the printing apparatus 1 to execute the ejection process will be described. Also, the processing illustrated in FIG. 4 to FIG. 8 is implemented by, when the printing apparatus 1 receives a print instruction from an external apparatus (not shown), executing the program stored in the ROM 202 or the like by the CPU 201 shown in FIG. 2.

First Embodiment

Figure 4:
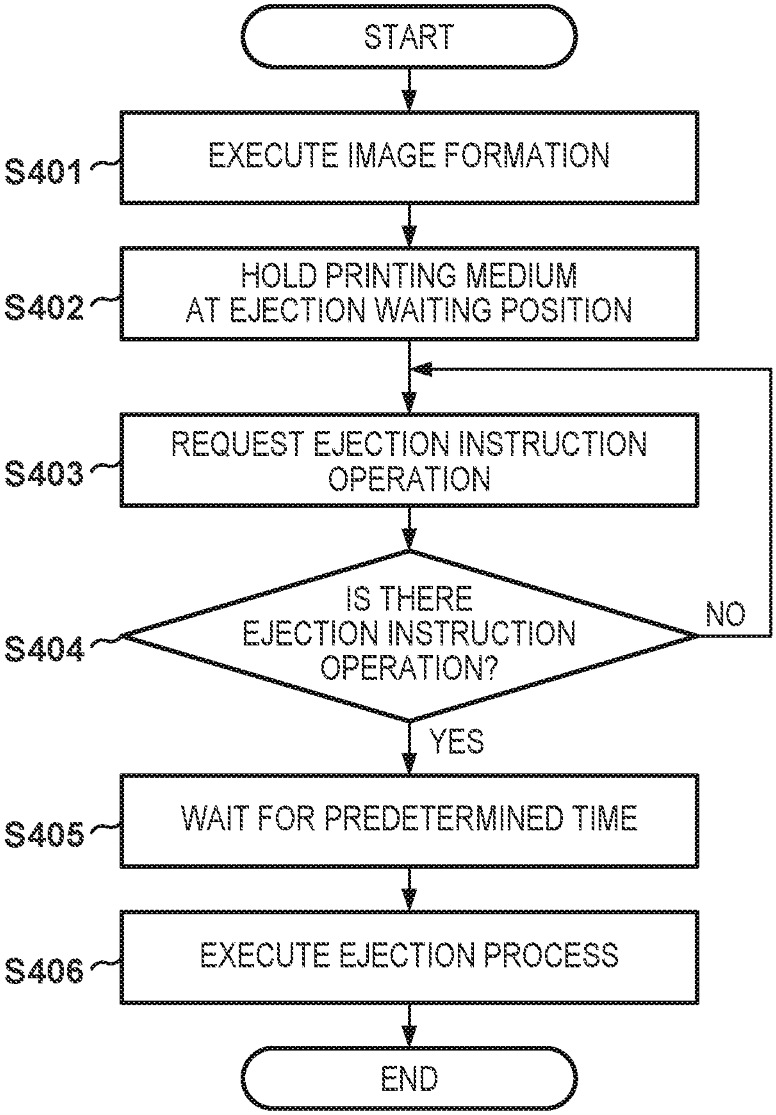
FIG. 4 is a flowchart illustrating an example of processing of the control unit according to the present embodiment.

First, the print process of the printing apparatus 1 executed by the CPU 201 will be described with reference to FIG. 4.

First, in step S401, the CPU 201 controls the supply unit driving motor 206 and the conveyance unit driving motor 207 to convey the cut sheet towards the downstream side of the conveyance direction. Also, the CPU 201 controls the carriage motor 208 to perform image formation onto the conveyed cut sheet. Next, in step S402, the CPU 201, before ejection is completed, controls the ejection unit driving motor 205, to convey the cut sheet to an ejection waiting position and cause the ejection unit 8 to hold the cut sheet. In one example, the CPU 201 controls the ejection unit driving motor 205 so as to perform conveyance for a predetermined length from the leading edge of the cut sheet and then hold the cut sheet. Another example of step S402 will be described later with reference to FIG. 8.

Next, the CPU 201 advances the processing to step S403 to display a screen requesting an ejection instruction operation on the operation panel 212. Next, the CPU 201 advances the processing to step S404, and repeats the processing in step S403 of requesting the ejection instruction operation until the ejection instruction operation is received. In a case where the CPU 201 determines that the ejection instruction operation is received (Yes in step S404), the CPU 201 advances the processing to step S405 to wait for a predetermined time. In one example, the wait time may be 1 second, 5 seconds, 10 seconds, or the like. Next, the CPU 201 advances the processing to step S406 to execute the ejection process. In one example, the ejection unit 8 resumes the conveyance of the cut sheet until the cut sheet is not held (nipped) by the ejection unit 8. In another example, in a case where the CPU 201 has a configuration in which the axial distance between a pair of ejection rollers included in the ejection unit 8 can be made larger, the CPU 201 increases the axial distance between the pair of ejection rollers to disengage the nipping and not hold the cut sheet. By this, the user can take out the ejected cut sheet.

As described above, the printing apparatus according to the present embodiment, in a case where the printing apparatus stops conveyance before ejection is completed and then receives the ejection instruction operation, waits for the predetermined time and then causes the ejection unit 8 to execute the ejection process. By this, the user, after performing the ejection instruction operation, can grip the cut sheet exiting from the ejection port with both hands and can reduce the possibility of dropping the cut sheet.

Note that in a case where the CPU 201 determines that the ejection instruction operation was received in step S404, the CPU 201 may notify the user of the timing that the ejection process is to be executed via the input/output I/F 211. For example, the CPU 201 may display a notification such as "STARTING EJECTION. PLEASE RECEIVE WITH BOTH HANDS THE PRINTED SHEET TO BE EJECTED" on a display of the operation unit 16. Alternatively, a speaker may be arranged in the printing apparatus 1 and voice such as "STARTING EJECTION" may be played via the speaker.

Second Embodiment

Figure 5:
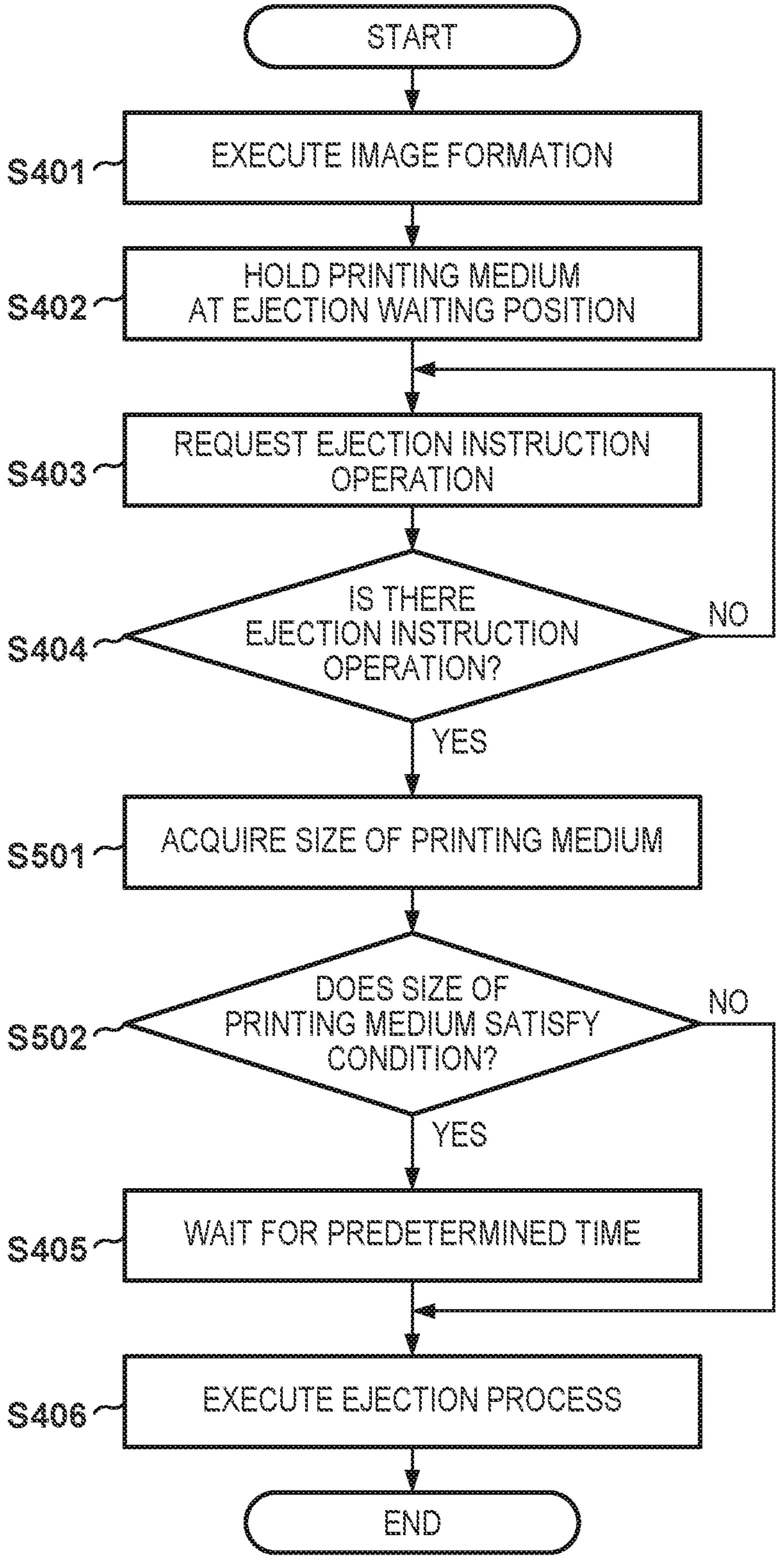
FIG. 5 is a flowchart illustrating an example of processing of the control unit according to the present embodiment.

Next, one example of a print process in the printing apparatus 1 that the CPU 201 executes will be described with reference to FIG. 5.

The processes from steps S401 to S404 are the same as in the first embodiment, and therefore description will be omitted. In step S404, when the CPU 201 determines that it has received the ejection instruction operation (Yes in step S404), the CPU 201 advances the processing to step S501 to acquire the size of the printing medium. In step S501, the CPU 201 may acquire the length in the conveyance direction (X direction) or may acquire the length in the main scanning direction (Y direction). For example, the CPU 201 can acquire a difference in time between when the conveyance sensor 7*b* detected the leading edge and the trailing edge of the cut sheet PM in the conveyance direction and then calculate the amount of rotation of the conveyance roller 7*a* within that time to acquire the length of the cut sheet PM in the conveyance direction. Also, the CPU 201 may acquire the length of the cut sheet PM in the conveyance direction based on the detecting unit 13 and the amount of rotation of the conveyance roller 7*a*. Furthermore, the CPU 201 may acquire the length based on the size of the cut sheet PM inputted by the user via the operation unit 16. Next, the CPU 201 advances the processing to step S502 to determine whether or not the size of the printing medium acquired in step S501 satisfies a predetermined condition. For example, in step S502, the CPU 201 determines whether or not the size of the printing media is greater than or equal to the predetermined size.

In step S502, in a case where the CPU 201 determines that the size of the printing medium satisfies the predetermined condition (Yes in step S502), the CPU 201 advances the processing to step S405, and as described in the first embodiment, executes the ejection process on a condition that the predetermined time has elapsed. Meanwhile, in step S502, in a case where the CPU 201 determines that the size of the printing medium does not satisfy the predetermined condition (No in step S502), the CPU 201 advances the processing to step S406, and executes the ejection process before the predetermined time elapses. By this, the ejection process is immediately executed for a printing medium that can be received easily with one hand such as that of a postcard size. By this, the time until the ejection can be reduced for printing media that are relatively small such as those that can be received easily with one hand, while the time it takes from the ejection instruction operation to the ejection can be increased for printing media that are relatively large so that they can be received with both hands.

Third Embodiment

Figure 6:
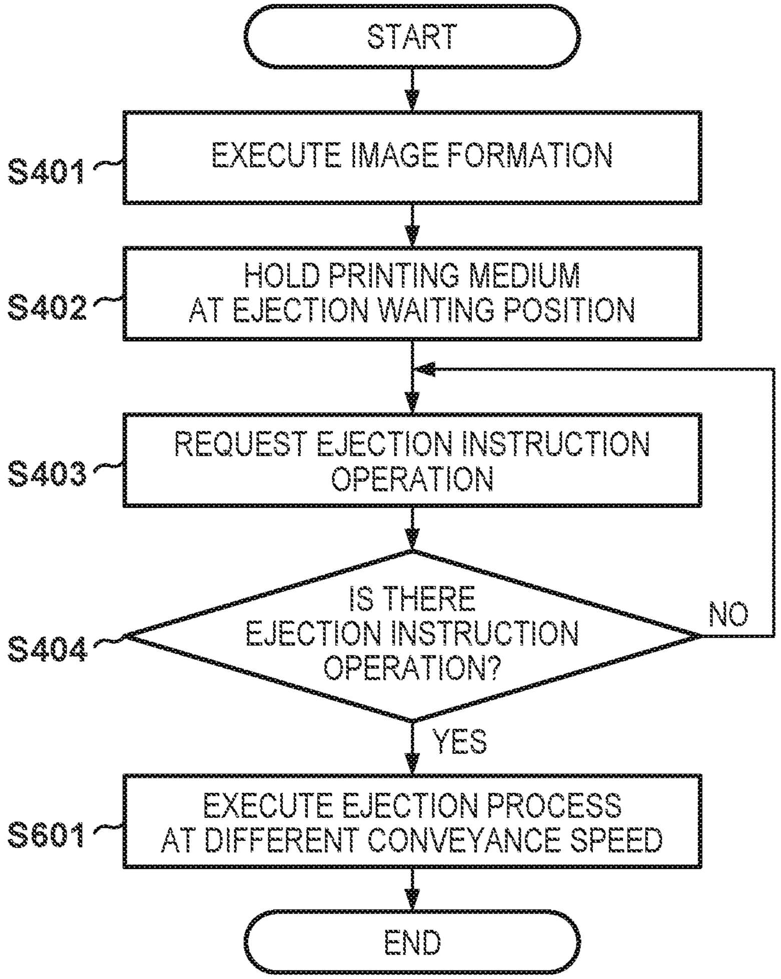
FIG. 6 is a flowchart illustrating an example of processing of the control unit according to the present embodiment.

Next, one example of the print process of the printing apparatus 1 that the CPU 201 executes will be described with reference to FIG. 6.

The processes from steps S401 to S404 are the same as in the first embodiment, and therefore description will be omitted. In step S404, when the CPU 201 determines that it has received the ejection instruction operation (Yes in step S404), the CPU 201 advances the processing to step S601, and executes the ejection process in a different manner to the step S401. For example, the CPU 201 controls the ejection unit 8 to convey at the conveyance speed of step S401, that is, a speed which is lower than before the conveyance was stopped, and increase the time it takes until the ejection process is completed. By this, the user can receive the printing media to be ejected with both hands after performing the ejection instruction operation.

Also, in another example, the CPU 201 at least temporarily reduces the conveyance speed of the printing medium PM while the ejection process of the ejection unit 8 is being executed. By this, the CPU 201 can increase the time it takes until the ejection process is completed, and the user can receive with both hands the printing medium to be ejected after performing the ejection instruction operation. Also, in the example in FIG. 6, the ejection unit 8, although at a low speed, executes the ejection process immediately after receiving the ejection instruction operation. By this, the user can recognize that he/she has not failed to press the button but also can have time for receiving with both hands the printing medium PM.

Also, in another example, the CPU 201 suspends for a predetermined time the conveyance of the printing medium PM while the ejection process of the ejection unit 8 is being executed. By this, the user can recognize that the printing apparatus 1 is performing the ejection process and can prepare to receive the printing medium PM until the conveyance is resumed.

Fourth Embodiment

Figure 7:
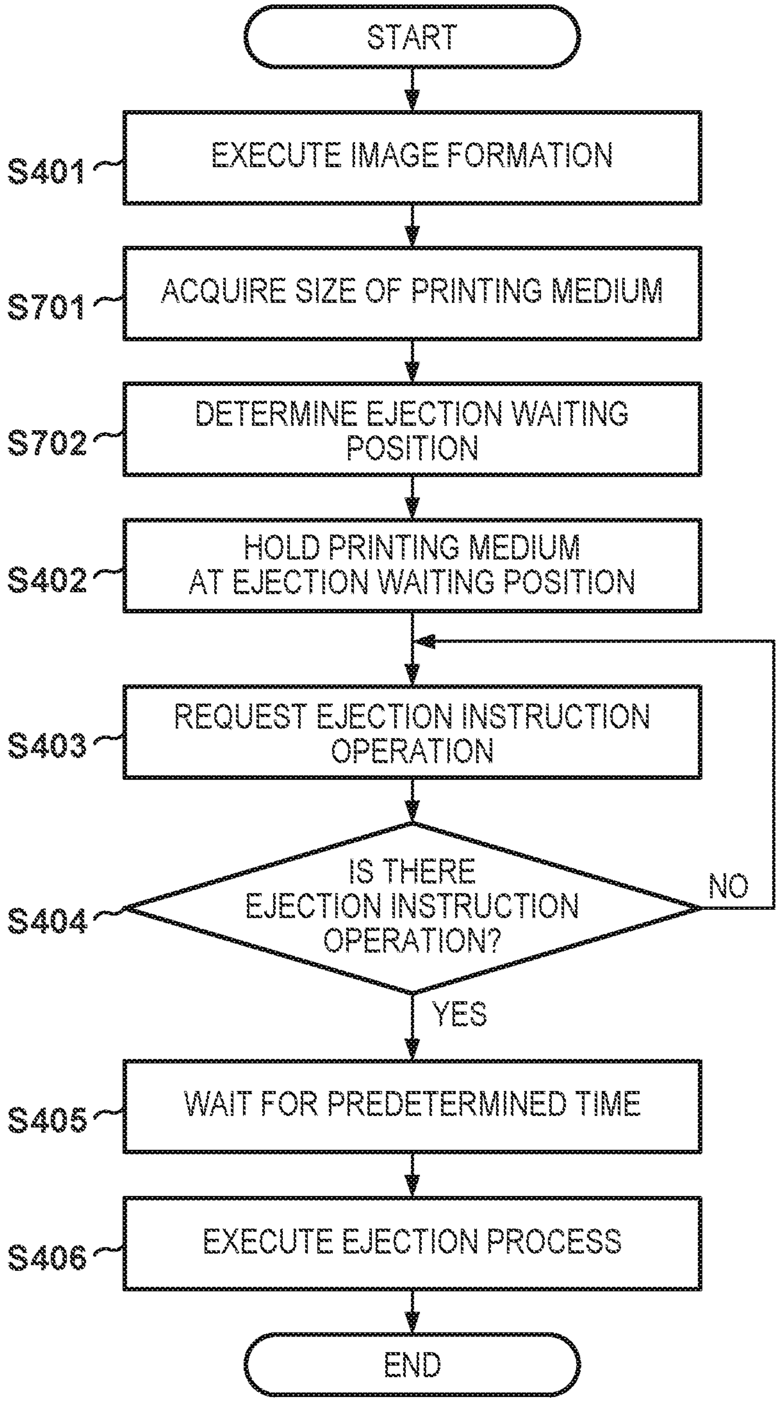
FIG. 7 is a flowchart illustrating an example of processing of the control unit according to the present embodiment.

Next, one example of the print process of the printing apparatus 1 that the CPU 201 executes will be described with reference to FIG. 7.

Step S401 is the same as in the first embodiment, and therefore description will be omitted. Next, the CPU 201 advances the processing to step S701 to acquire the size of the printing medium PM in the conveyance direction. In one example, the CPU 201 may acquire the size in the conveyance direction of the printing medium PM during image formation, that is, in the middle of step S401. Also, in one example, the CPU 201 may acquire the size of the printing medium PM in the main scanning direction (Y direction) in step S701. Next, the CPU 201 advances the processing to step S702 to determine the ejection waiting position in accordance with the acquired size of the printing medium PM. In one example, the ejection waiting position is a position such as near the trailing edge of the printing medium PM in the conveyance direction where image is not formed by the printing unit 5. For example, in a case where the size of the printing medium PM in the conveyance direction is 297 mm, the ejection waiting position may be at a position that is 270 mm from the leading edge of the printing medium PM in the conveyance direction. By this, it becomes possible to not hold a region of the printing medium PM onto which the image was formed in the processing in steps S402 to S404 in which the ejection instruction operation is awaited, and the ink on the printing medium PM can be dried evenly. Furthermore, deterioration of image that was formed on the printing medium PM and transfer of ink onto the ejection unit 8 which nips the printing medium PM can be prevented. Next, the CPU 201 advances the processing to step S402 to perform holding of the printing medium PM at the ejection waiting position determined in step S702. The processes from steps S403 to S406 are the same as in the first embodiment, and therefore description will be omitted.

As described above the printing apparatus according to the present embodiment determines the size in the conveyance direction of the printing medium PM and waits while holding an area that is not printed by the printing unit 5 and is near the trailing edge of the printing medium PM in the conveyance direction of the printing medium PM. By this, the region of the printing medium PM onto which printing was performed can be dried evenly.

Fifth Processing Example

Figure 8:
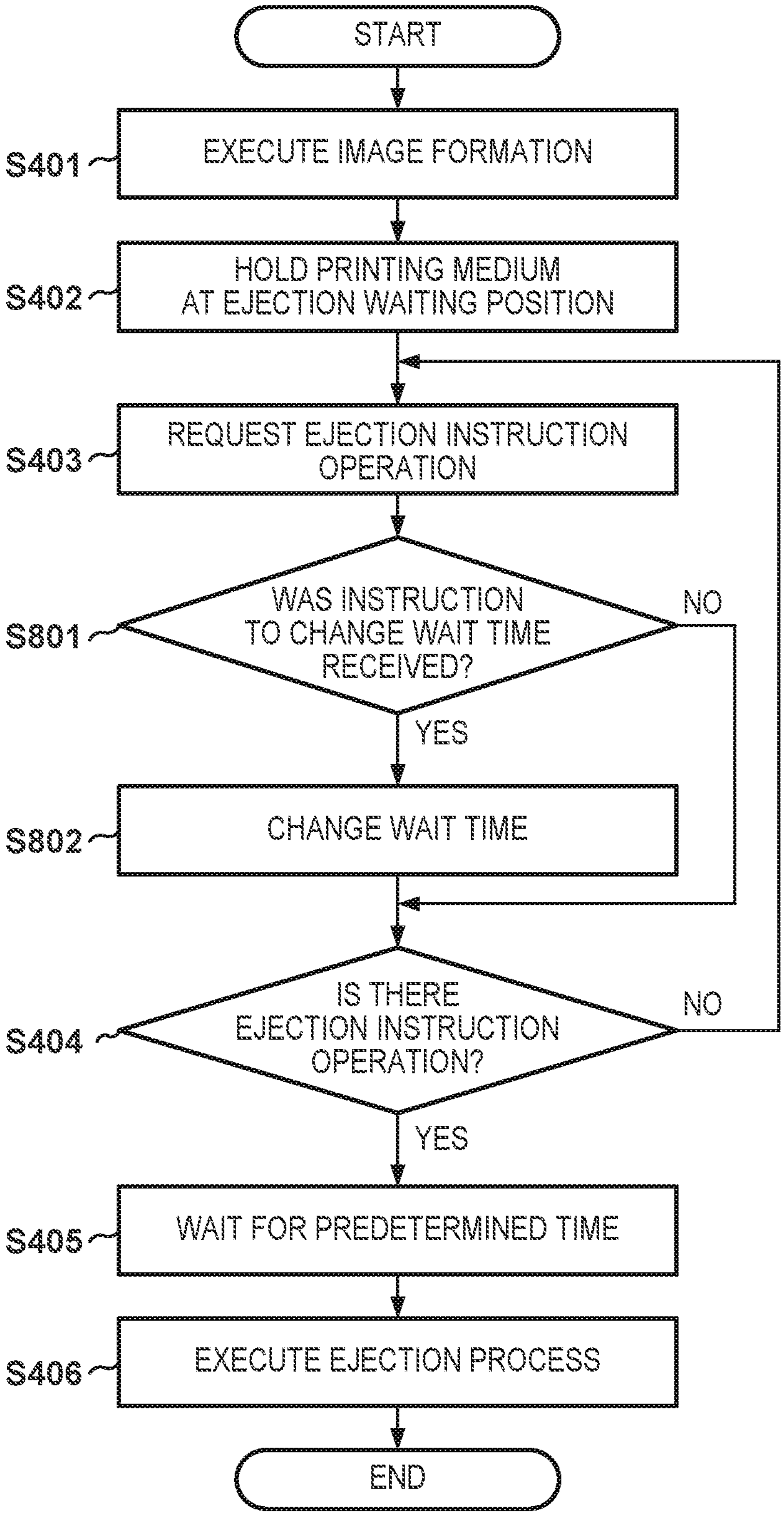
FIG. 8 is a flowchart illustrating an example of processing of the control unit according to the present embodiment.

Next, one example of a print process in the printing apparatus 1 that the CPU 201 executes will be described with reference to FIG. 8.

The processes from steps S401 to S403 are the same as in the first embodiment, and therefore description will be omitted. Next, the CPU 201 advances the processing to step S801 to determine whether or not an instruction to change the wait time was received. For example, the CPU 201 may display on the operation panel selection items that can be set as a wait time such as "0.5 second", "1 second", and "3 seconds" and may set the wait time in accordance with an operation on the operation panel. In a case where the CPU 201 receives an instruction to change the wait time in step S801 (Yes in step S801), the CPU 201 advances the processing to step S802 to set to wait in step S405 for the time corresponding to the change instruction. In a case where the CPU 201 does not receive an instruction to change the wait time in step S801 (No in step S801), the CPU 201 advances the processing to step S404.

The processes from steps S404 to S406 are the same as in the first embodiment, and therefore description will be omitted.

Note that in one example, a wait time instruction may be included in the ejection instruction operation. For example, configuration may be taken so as to execute the ejection process after waiting for a predetermined time in a case where a specific push button was pressed, or to execute the ejection process after waiting for a time shorter than the predetermined time in a case where a push button different from the specific push button was pressed. Alternatively, configuration may be taken so that the CPU 201 executes the ejection process after waiting for the predetermined time such as 2 seconds in a case where the user presses a certain button, or the CPU 201 executes the ejection process immediately without waiting in a case where the user presses another button. By this, the user can select the wait time in accordance with a situation in which he/she will be using the printing apparatus 1, so as to be able to execute the ejection process immediately in a case where the user that presses the button and the user that receives the printing medium PM to be ejected are different, or the like.

Other Embodiments

Figure 9A:
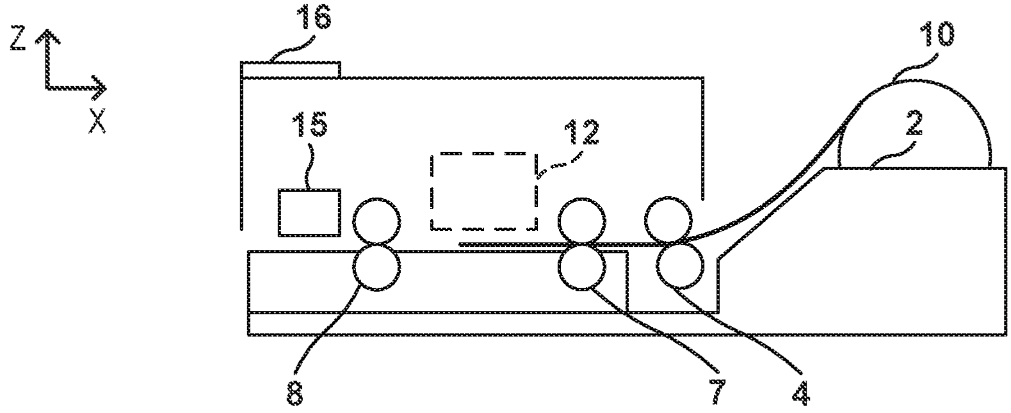
FIG. 9A is a view for describing an operation of the printing apparatus according to the present embodiment.
Figure 9B:
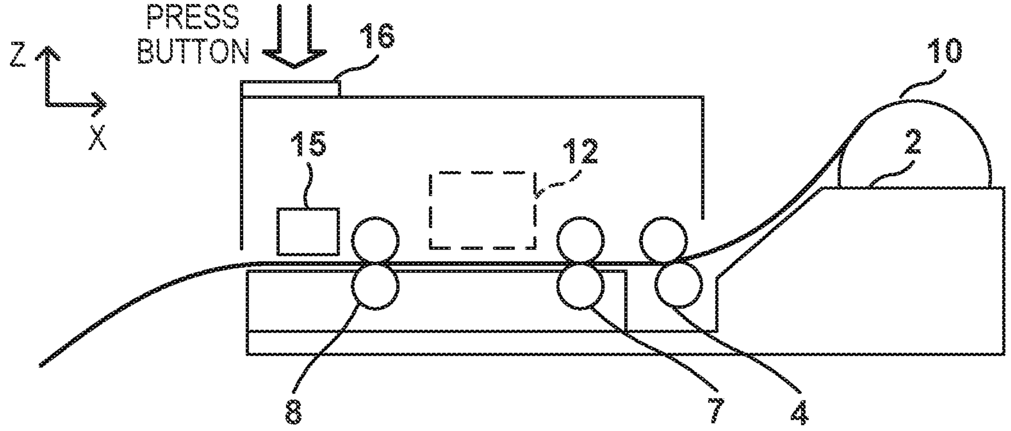
FIG. 9B is a view for describing an operation of the printing apparatus according to the present embodiment.
Figure 9C:
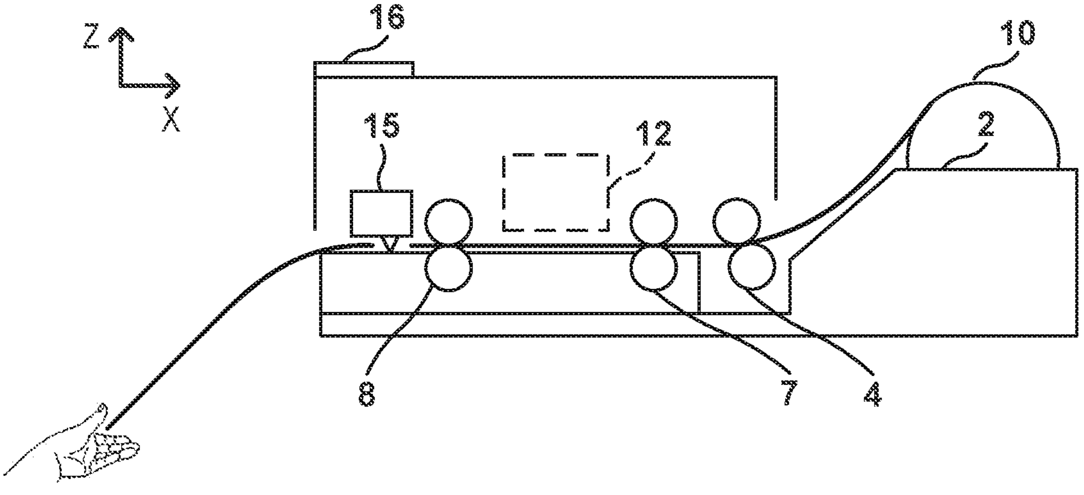
FIG. 9C is a view for describing an operation of the printing apparatus according to the present embodiment.

In the first embodiment, a case where the printing medium is a cut sheet was described. However, the invention can be applied also to a case where the printing medium is a roll sheet. A print process of the printing apparatus for printing onto a roll sheet will be described with reference to FIG. 9A to FIG. 9C. FIGS. 9A to 9C illustrate cross-sectional views of the printing apparatus 1 after a print instruction is received from a user, and in time series order, the processing transitions in order from FIG. 9A to FIG. 9B to FIG. 9C.

FIG. 9A illustrates a cross-sectional view of the printing apparatus 1 at a point in time when the print process of the printing apparatus 1 has started after the print instruction is received from the user. A sheet wound out from a roll 10 is conveyed from the supply unit 4 to the conveyance unit 7. Also, printing onto the sheet by the printing unit 5 of the carriage 12 is performed together with the conveyance of the sheet.

Next, FIG. 9B illustrates a cross-sectional view of the printing apparatus 1 at the point in time when the print process of the printing apparatus 1 is completed. When printing by the printing unit 5 finishes, the sheet is conveyed by the ejection unit 8, but the ejection unit 8 stops conveyance of the sheet at a predetermined position, and holds the sheet. By this, the user recognizes that the print process has ended and can make preparations to receive the printed sheet. In FIG. 9B, the user presses a button on the operation unit 16, and instructs execution of the ejection process to the printing apparatus 1.

Next, FIG. 9C illustrates a cross-sectional view of the printing apparatus 1 at a point in time when the ejection process has started. In FIG. 9C, the cutter unit 15 cuts the sheet in the main scanning direction (Y direction). The user grips the sheet that has exited from the ejection port, and receives the printed cut sheet so that it does not drop. In such a case, the cutting process by the cutter unit 15 is included in the ejection process.

Note that in a case where the ejection unit 8 is positioned further on the downstream side of the conveyance direction than the cutter unit 15, configuration may be taken so that the cutter unit 15 performs cutting of the sheet in the Y direction before receiving the ejection instruction operation from the user and the ejection unit 8 holds the cut sheet. In such a case, configuration may be taken so that in a case where the ejection instruction operation is received from the user, the printing apparatus 1 as described in the first embodiment, executes the ejection process by conveying by the ejection unit 8 the sheet that was cut by the cutter unit 15.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038124, filed on Mar. 5, 2020, which is hereby incorporated by reference herein in its entirety.

What is claimed is:

1. A printing apparatus comprising:

a pair of rollers configured to convey a printing medium;

a control unit configured to cause the pair of rollers to hold the printing medium onto which printing has been performed by a printing unit; and an operation panel configured to receive an ejection instruction for instructing to eject the printing medium, wherein the control unit, in a case where the operation panel receives the ejection instruction, controls the pair of rollers to allow ejection of the printing medium to outside of the printing apparatus after a predetermined time has elapsed, and wherein the control unit controls the pair of rollers to allow ejection of the printing medium to the outside of the printing apparatus by increasing a distance between an axis of each of the pair of rollers.

2. The printing apparatus according to claim 1, wherein the pair of rollers is arranged downstream of the printing unit in a conveyance direction of the printing medium, and nips the printing medium onto which printing has been performed by the printing unit.

3. The printing apparatus according to claim 1, wherein the control unit controls the pair of rollers to suspend conveyance of the printing medium to the outside of the printing apparatus.

4. The printing apparatus according to claim 1, wherein the control unit, in a case where a size of the printing medium is smaller than a predetermined size, controls the pair of rollers to allow ejection of the printing medium to the outside of the printing apparatus regardless of the lapse of the predetermined time.

5. The printing apparatus according to claim 1, wherein the control panel notifies of information related to the predetermined time before the operation unit receives the ejection instruction.

6. The printing apparatus according to claim 5, wherein the control unit, after waiting for a time that corresponds to one of a plurality of selection items selected via the operation panel, controls the pair of rollers to allow ejection of the printing medium to the outside of the printing apparatus.

7. The printing apparatus according to claim 5, wherein the control unit notifies via at least one of a display and a speaker.

8. The printing apparatus according to claim 1, wherein the control unit, before receiving the ejection instruction, controls the pair of rollers to hold an area, of the printing medium, that is not printed by the printing unit.

9. The printing apparatus according to claim 1, wherein the control unit notifies with an instruction that prompts a user to hold the printing medium to be ejected before receiving the ejection instruction.

10. The printing apparatus according to claim 9, wherein the control unit notifies via at least one of a display and a speaker.

11. A printing apparatus comprising:

a pair of rollers configured to convey a printing medium;

a control unit configured to cause the pair of rollers to hold the printing medium onto which printing has been performed by a printing unit; and an operation panel configured to receive an ejection instruction for instructing to eject the printing medium, wherein the control unit controls the pair of rollers to eject the printing medium to outside of the printing apparatus, after receiving the ejection instruction, at a predetermined speed lower than a conveyance speed for printing by the printing unit.

12. A control method of a printing apparatus having a pair of rollers configured to convey a printing medium, the method comprising:

causing the pair of rollers to hold the printing medium onto which printing has been performed by a printing unit;

receiving an ejection instruction for instructing to eject the printing medium; and controlling, after receiving the ejection instruction, the pair of rollers to eject the printing medium to outside of the printing apparatus at a predetermined speed lower than a conveyance speed for printing by the printing unit.

* * * * *